US009813411B2

United States Patent
Thibadeau, Sr. et al.

(10) Patent No.: US 9,813,411 B2
(45) Date of Patent: Nov. 7, 2017

(54) METHOD AND SYSTEM OF PROVIDING A PICTURE PASSWORD PROOF OF KNOWLEDGE AS A WEB SERVICE

(71) Applicant: ANTIQUE BOOKS, INC., Pittsburgh, PA (US)

(72) Inventors: Robert H. Thibadeau, Sr., Pittsburgh, PA (US); Justin D. Donnell, Verona, PA (US)

(73) Assignee: Antique Books, Inc., Pittsburgh, PA (US)

( * ) Notice: Subject to any disclaimer, the term of this patent is extended or adjusted under 35 U.S.C. 154(b) by 65 days.

(21) Appl. No.: 14/782,257

(22) PCT Filed: Mar. 31, 2014

(86) PCT No.: PCT/US2014/032342
§ 371 (c)(1),
(2) Date: Oct. 2, 2015

(87) PCT Pub. No.: WO2014/165431
PCT Pub. Date: Oct. 9, 2014

(65) Prior Publication Data
US 2016/0050198 A1    Feb. 18, 2016

Related U.S. Application Data

(60) Provisional application No. 61/808,905, filed on Apr. 5, 2013.

(51) Int. Cl.
G06F 7/04   (2006.01)
H04L 29/06  (2006.01)

(52) U.S. Cl.
CPC ........ *H04L 63/083* (2013.01); *H04L 63/0281* (2013.01); *H04L 63/0807* (2013.01); *H04L 63/0815* (2013.01); *H04L 63/0823* (2013.01)

(58) Field of Classification Search
CPC ............... H04L 63/083; H04L 63/0281; H04L 63/0815; H04L 63/0823; G06F 21/36
See application file for complete search history.

(56) References Cited

U.S. PATENT DOCUMENTS 5,559,961 A   9/1996 Blonder
6,209,104 B1  3/2001 Jalili
(Continued)

FOREIGN PATENT DOCUMENTS

EP   1601153 A2   11/2005
EP   2085908 A2   8/2009
(Continued)

OTHER PUBLICATIONS

International Search Report and Written Opinion for PCT/US2016/020670, dated May 12, 2016, 11 pages.
(Continued)

*Primary Examiner* — Techane Gergiso
(74) *Attorney, Agent, or Firm* — Withrow & Terranova, PLLC

(57) ABSTRACT

A server provides a picture password proof of knowledge. The server includes a processor creating a user identifier when communicating with a relying party (RP) server, sending the identifier to the RP server, creating a login token in response to a user authentication request originating from a client browser (CB), sending a web address containing the login token to the RP server, receiving and authenticating actions from the CB regarding the proof of knowledge, generating and sending an authentication token to the CB responsive to the received and authenticated actions, receiving from the RP server a request for an identification token, the request including the authentication token, and generat-
(Continued)

ing and sending the identification token to the RP server to enable the user at the CB to be verified and logged-in to the RP server.

23 Claims, 5 Drawing Sheets

(56) References Cited

U.S. PATENT DOCUMENTS

| | | | |
|---|---|---|---|
| 6,249,868 B1 | 6/2001 | Sherman et al. | |
| 6,411,283 B1 | 6/2002 | Murphy | |
| 6,658,328 B1 | 12/2003 | Alrabady et al. | |
| 6,934,860 B1 | 8/2005 | Goldstein | |
| 6,983,065 B1 | 1/2006 | Akgul et al. | |
| 7,243,239 B2 | 7/2007 | Kirovski et al. | |
| 7,370,351 B1 | 5/2008 | Ramachandran et al. | |
| 7,734,930 B2 | 6/2010 | Kirovski et al. | |
| 8,015,563 B2 | 9/2011 | Araujo, Jr. et al. | |
| 8,024,775 B2 | 9/2011 | Xu et al. | |
| 8,155,622 B1 | 4/2012 | Moshenberg et al. | |
| 8,191,126 B2 | 5/2012 | Raghavan | |
| 8,353,016 B1 | 1/2013 | Pravetz et al. | |
| 8,392,975 B1* | 3/2013 | Raghunath | G06F 17/30265 726/19 |
| 8,627,421 B1 | 1/2014 | Bowers et al. | |
| 8,667,560 B2* | 3/2014 | Albisu | G06F 21/36 705/14.4 |
| 8,682,802 B1* | 3/2014 | Kannanari | G06Q 20/3274 705/64 |
| 8,813,183 B2 | 8/2014 | Thibadeau et al. | |
| 8,813,247 B1 | 8/2014 | Alten | |
| 8,832,804 B1 | 9/2014 | Casey et al. | |
| 8,881,251 B1* | 11/2014 | Hilger | H04L 63/083 713/183 |
| 8,918,851 B1 | 12/2014 | Iannamico | |
| 8,966,268 B2* | 2/2015 | Marien | G06F 21/34 713/172 |
| 9,300,659 B2 | 3/2016 | Thibadeau, Sr. et al. | |
| 9,323,435 B2 | 4/2016 | Thibadeau, Sr. et al. | |
| 2002/0029341 A1 | 3/2002 | Juels et al. | |
| 2002/0080123 A1 | 6/2002 | Kennedy et al. | |
| 2002/0196274 A1 | 12/2002 | Comfort et al. | |
| 2003/0147536 A1 | 8/2003 | Andivahis et al. | |
| 2004/0010721 A1 | 1/2004 | Kirovski et al. | |
| 2004/0030934 A1 | 2/2004 | Mizoguchi et al. | |
| 2004/0034801 A1 | 2/2004 | Jaeger | |
| 2004/0073809 A1 | 4/2004 | Wing Keong | |
| 2004/0095384 A1 | 5/2004 | Avni et al. | |
| 2004/0230843 A1 | 11/2004 | Jansen | |
| 2006/0206717 A1 | 9/2006 | Holt et al. | |
| 2006/0244735 A1 | 11/2006 | Wilson | |
| 2007/0005962 A1 | 1/2007 | Baker | |
| 2007/0067631 A1 | 3/2007 | Westhoff | |
| 2007/0097096 A1 | 5/2007 | Rosenberg | |
| 2007/0150842 A1 | 6/2007 | Chaudhri et al. | |
| 2007/0229216 A1 | 10/2007 | Yasuda | |
| 2008/0010678 A1 | 1/2008 | Burdette et al. | |
| 2008/0022129 A1 | 1/2008 | Durham et al. | |
| 2008/0163055 A1 | 7/2008 | Ganz et al. | |
| 2008/0201578 A1* | 8/2008 | Drake | G06F 21/36 713/172 |
| 2008/0263361 A1 | 10/2008 | Dutta et al. | |
| 2009/0089869 A1 | 4/2009 | Varghese | |
| 2009/0106134 A1 | 4/2009 | Royyuru | |
| 2009/0158424 A1 | 6/2009 | Yang | |
| 2009/0160800 A1 | 6/2009 | Liu et al. | |
| 2009/0199002 A1 | 8/2009 | Erickson | |
| 2009/0202153 A1 | 8/2009 | Cortopassi et al. | |
| 2009/0313693 A1 | 12/2009 | Rogers | |
| 2010/0043062 A1 | 2/2010 | Alexander et al. | |
| 2010/0146128 A1 | 6/2010 | Kulkarni et al. | |
| 2010/0169958 A1 | 7/2010 | Werner et al. | |
| 2010/0207721 A1 | 8/2010 | Nakajima et al. | |
| 2010/0223326 A1 | 9/2010 | Noldus et al. | |
| 2011/0013031 A1 | 1/2011 | Miyasako | |
| 2011/0055585 A1 | 3/2011 | Lee | |
| 2011/0081640 A1 | 4/2011 | Tseng et al. | |
| 2011/0099203 A1 | 4/2011 | Fastring | |
| 2011/0162067 A1 | 6/2011 | Shuart et al. | |
| 2011/0191592 A1 | 8/2011 | Goertzen | |
| 2011/0197259 A1 | 8/2011 | Thibadeau et al. | |
| 2011/0202982 A1* | 8/2011 | Alexander | G06F 21/36 726/7 |
| 2012/0005483 A1 | 1/2012 | Patvarczki et al. | |
| 2012/0011564 A1* | 1/2012 | Osborn | G06F 21/36 726/2 |
| 2012/0054833 A1* | 3/2012 | Albisu | G06F 21/43 726/4 |
| 2012/0084869 A1 | 4/2012 | Bilaney et al. | |
| 2012/0167199 A1 | 6/2012 | Riddiford | |
| 2012/0175412 A1* | 7/2012 | Grabiner | G06F 19/327 235/375 |
| 2012/0304284 A1 | 11/2012 | Johnson et al. | |
| 2013/0031623 A1* | 1/2013 | Sanders | G06F 21/34 726/19 |
| 2013/0042303 A1 | 2/2013 | Chow et al. | |
| 2013/0043914 A1 | 2/2013 | Gelman | |
| 2013/0047236 A1 | 2/2013 | Singh | |
| 2013/0097697 A1 | 4/2013 | Zhu et al. | |
| 2013/0104197 A1 | 4/2013 | Nandakumar | |
| 2013/0111581 A1 | 5/2013 | Griffin et al. | |
| 2013/0179954 A1 | 7/2013 | Bidare | |
| 2013/0201106 A1 | 8/2013 | Naccache | |
| 2013/0268775 A1 | 10/2013 | Hawkins | |
| 2013/0340057 A1* | 12/2013 | Kitlyar | G06F 21/36 726/6 |
| 2014/0006512 A1 | 1/2014 | Huang et al. | |
| 2014/0023279 A1 | 1/2014 | Fahn et al. | |
| 2014/0028554 A1 | 1/2014 | De Los Reyes et al. | |
| 2014/0181956 A1 | 6/2014 | Ahn et al. | |
| 2014/0201831 A1* | 7/2014 | Yi | G06F 21/31 726/19 |
| 2014/0233740 A1 | 8/2014 | Niamut et al. | |
| 2014/0282961 A1* | 9/2014 | Dorfman | H04L 63/0823 726/7 |
| 2014/0320420 A1 | 10/2014 | Ida et al. | |
| 2014/0331057 A1 | 11/2014 | Thibadeau et al. | |
| 2014/0359653 A1 | 12/2014 | Thorpe et al. | |
| 2014/0373132 A1 | 12/2014 | Basmov et al. | |
| 2015/0033306 A1 | 1/2015 | Dickenson et al. | |
| 2015/0138584 A1 | 5/2015 | Tsongas et al. | |
| 2015/0180902 A1 | 6/2015 | Biswas et al. | |
| 2015/0301724 A1 | 10/2015 | Thibadeau, Sr. et al. | |
| 2015/0304303 A1 | 10/2015 | Thibadeau, Sr. et al. | |
| 2015/0310188 A1 | 10/2015 | Ford et al. | |
| 2015/0349957 A1 | 12/2015 | Thibadeau, Sr. et al. | |
| 2015/0350210 A1 | 12/2015 | Thibadeau, Sr. et al. | |
| 2016/0044021 A1 | 2/2016 | Thibadeau, Sr. et al. | |
| 2016/0195995 A1 | 7/2016 | Thibadeau, Sr. et al. | |

FOREIGN PATENT DOCUMENTS

| | | |
|---|---|---|
| EP | 2775416 A2 | 9/2014 |
| GB | 2504746 A | 2/2014 |
| RU | 2013113592 A | 10/2014 |
| WO | 03048909 A2 | 6/2003 |
| WO | 2009039223 A1 | 3/2009 |
| WO | 2011014878 A1 | 2/2011 |
| WO | 2011100017 A1 | 8/2011 |
| WO | 2013003535 A1 | 1/2013 |
| WO | 2014165431 A1 | 10/2014 |

OTHER PUBLICATIONS

Examination Report for European Patent Application No. 10845949.6, dated Jun. 13, 2016, 6 pages.
Non-Final Office Action for U.S. Appl. No. 15/069,635, dated Jun. 16, 2016, 6 pages.
Notice of Allowance for U.S. Appl. No. 14/728,904, dated Jul. 1, 2016, 12 pages.

(56) References Cited

OTHER PUBLICATIONS

Notice of Allowance for U.S. Appl. No. 14/823,739, dated Jul. 12, 2016, 8 pages.
Advisory Action for U.S. Appl. No. 14/330,986, dated May 2, 2016, 3 pages.
Notice of Allowance for U.S. Appl. No. 14/728,902, dated Mar. 11, 2016, 7 pages.
Final Office Action for U.S. Appl. No. 14/823,739, dated Apr. 28, 2016, 10 pages.
Non-Final Office Action for U.S. Appl. No. 14/693,121, dated Aug. 6, 2015, 16 pages.
Non-Final Office Action for U.S. Appl. No. 14/728,902, dated Aug. 26, 2015, 15 pages.
Invitation to Pay Additional Fees and Partial International Search Report for PCT/US2015/033823, dated Aug. 14, 2015, 7 pages.
International Search Report and Written Opinion for PCT/US2015/033830, dated Aug. 24, 2015, 11 pages.
Non-Final Office Action for U.S. Appl. No. 14/330,986, dated Sep. 15, 2015, 16 pages.
Non-Final Office Action for U.S. Appl. No. 14/728,759, dated Sep. 10, 2015, 15 pages.
International Search Report and Written Opinion for PCT/US2015/033811, dated Sep. 21, 2015, 10 pages.
Author Unknown, "Human Verification," graphicdesign.stackexchange.com, 1 page.
Author Unknown, "OpenID Authentication 2.0—Final," Openid.net, Dec. 5, 2007, retrieved on Jan. 1, 2013 from http://openid.net/specs/openid-authenication-2_0.html#http_encoding, 34 pages.
Author Unknown, "Security Assertion Markup Language (SAML) V2.0 Technical Overview," OASIS, Mar. 25, 2008, retrieved on Apr. 14, 2010 from http://docs.oasis-open.org/security/saml/Post2.0/sstc-saml-tech-overview.2.0-cd-02.pdf, 51 pages.
Beideman, Calvin et al., "Set Families with Low Pairwise Intersection," Apr. 17, 2014, retrieved Jan. 15, 2015 from http://www.cs.cmu.edu/~jblocki/, 12 pages.
Blocki, Jeremiah et al., "Adaptive Regret Minimization in Bounded-Memory Games," Decision and Game Theory for Security: Proceedings of the 4th International Conference on Decision and Game Theory for Security (GameSec), Nov. 11-12, 2013, Fort Worth, TX, Springer International Publishing, pp. 65-84, retrieved Jan. 15, 2015 from http://www.cs.cmu.edu/~jblocki/, 19 pages.
Blocki, Jeremiah et al., "Adaptive Regret Minimization in Bounded-Memory Games," Presentation Slides, retrieved Jan. 15, 2015 from http://www.cs.cmu.edu/~jblocki/, 61 pages.
Blocki, Jeremiah et al., "Audit Games," Proceedings of the 23rd International Joint Conference on Artificial Intelligence, Aug. 3-9, 2013, Beijing, China, AAAI Press, pp. 41-47.
Blocki, Jeremiah et al., "Audit Games with Multiple Defender Resources," retrieved Jan. 15, 2015 from http://www.cs.cmu.edu/~jblocki/, 11 pages.
Blocki, Jeremiah et al., "Audit Mechanisms for Provable Risk Management and Accountable Data Governance," Decision and Game Theory for Security: Proceedings of the 3rd International Conference on Decision and Game Theory for Security (GameSec), Budapest, Hungary, Nov. 5-6, 2012, Springer Berlin Heidelberg, pp. 38-59, retrieved Jan. 15, 2015 from http://www.cs.cmu.edu/~jblocki/, 27 pages.
Blocki, Jeremiah et al., "Audit Mechanisms for Privacy Protection in Healthcare Environments," Proceedings of the 2nd USENIX Conference on Health Security and Privacy (HealthSec'11), Aug. 8-12, 2011, San Francisco, CA, USENIX Association, p. 10, retrieved Jan. 15, 2015 from http://www.cs.cmu.edu/~jblocki/, 2 pages.
Blocki, Jeremiah et al., "Differentially Private Data Analysis of Social Networks via Restricted Sensitivity," Proceedings of the 4th Conference on Innovations in Theoretical Computer Science (ITCS '13), Jan. 10-12, 2013, Berkely, CA, ACM, pp. 87-96, retrieved Jan. 15, 2015 from http://arxiv.org/abs/1208.4586v2, 19 pages.
Blocki, Jeremiah et al., "Differentially Private Data Analysis of Social Networks via Restricted Sensitivity," Presentation Slides, Fall 2012, retrieved Jan. 15, 2015 from http://www.cs.cmu.edu/~jblocki/, 94 pages.
Blocki, Jeremiah, "Senior Research Thesis: Direct Zero-Knowledge Proofs," May 1, 2009, retrieved Jan. 15, 2015 from http://www.cs.cmu.edu/~jblocki/, 16 pages.
Blocki, Jeremiah et al., "Gotcha Password Hackers!" Proceedings of the 2013 ACM Workshop on Artificial Intelligence and Security (AISec '13), Nov. 4-8, 2013, Berlin, Germany, ACM, 12 pages.
Blocki, Jeremiah et al., "Gotcha Password Hackers!" Presentation Slides, retrieved Jan. 15, 2015 from http://www.cs.cmu.edu/~jblocki/, 38 pages.
Blocki, Jeremiah et al., "Human Computable Passwords," Oct. 2, 2014, retrieved Jan. 15, 2015 from http://www.cs.cmu.edu/~jblocki/, 43 pages.
Blocki, Jeremiah et al., "Human Computable Passwords," Presentation Slides, Fall 2014, retrieved Jan. 15, 2015 from http://www.cs.cmu.edu/~jblocki/, 111 pages.
Blocki, Jeremiah et al., "The Johnson-Lindenstrauss Transform Itself Preserves Differential Privacy," Proceedings of the 2012 IEEE 53rd Annual Symposium on Foundations of Computer Science (FOCS), Oct. 20-23, 2012, New Brunswick, NJ, IEEE Computer Society, pp. 410-419, retrieved Jan. 15, 2015 from http://www.cs.cmu.edu/~jblocki/, 27 pages.
Blocki, Jeremiah et al., "Naturally Rehearsing Passwords," Advances in Cryptology—ASIACRYPT 2013: Proceedings of the 19th International Conference on the Theory and Application of Cryptology and Information Security, Part II, Bengalaru, India, Dec. 1-5, 2013 Springer Berlin Heidelberg, pp. 361-380, retrieved Jan. 15, 2015 from http://www.cs.cmu.edu/~jblocki/, 34 pages.
Blocki, Jeremiah et al., "Optimizing Password Composition Policies," Proceedings of the 14th ACM Conference on Electronic Commerce, Jun. 16-20, 2013, Philadelphia, PA, ACM, pp. 105-122, retrieved Jan. 15, 2015 from http://www.cs.cmu.edu/~jblocki/, 27 pages.
Blocki, Jeremiah, "Usable and Secure Password Management," Presentation Slides, Spring 2012, retrieved Jan. 15, 2015 from http://www.cs.cmu.edu/~jblocki/, 75 pages.
Blocki, Jeremiah et al., "Regret Minimizing Audits: A Learning-theoretic Basis for Privacy Protection," 2011 IEEE 24th Computer Security Foundations Symposium (CSF), Jun. 27-29, 2011, Cernay-la-Ville, France, IEEE, pp. 312-327, retrieved Jan. 15, 2015 from http://www.cs.cmu.edu/~jblocki/, 16 pages.
Blocki, Jeremiah et al., "Resolving the Complexity of Some Data Privacy Problems," Automata, Languages and Programming: Proceedings of the 37th International Colloquium Conference on Automata, Languages and Programming (ICALP 2010), Jul. 6-10, 2010, Bordeaux, France, Springer Berlin Heidelberg, pp. 393-404, retrieved Jan. 15, 2015 from http://www.cs.cmu.edu/~jblocki/, 18 pages.
Blocki, Jeremiah et al., "Resolving the Complexity of Some Data Privacy Problems," Presentation Slides, 2010, retrieved Jan. 15, 2015 from http://www.cs.cmu.edu/~jblocki/, 36 pages.
Blocki, Jeremiah et al., "Spaced Repetition and Mnemonics Enable Recall of Multiple Strong Passwords," Oct. 6, 2014, retrieved Jan. 15, 2015 from http://www.cs.cmu.edu/~jblocki/, 16 pages.
Blocki, Jeremiah, "Usable Human Authentication: A Quantitative Treatment," Doctoral Thesis, Jun. 30, 2014, retrieved Jan. 15, 2015 from http://www.cs.cmu.edu/~jblocki/, 262 pages.
Dunphy, Paul et al., "Do Background Images Improve "Draw a Secret" Graphical Passwords?" Proceedings of the 14th ACM Conference on Computer and Communications Security (CCS '07), Oct. 29-Nov. 2, 2007, Alexandria, Virginia, ACM, pp. 36-47.
Hughes, Neil, "Future iPhones, iPads could recognize, adjust for individual users," AppleInsider, Aug. 19, 2010, 4 pages, http://appleinsider.com/articles/10/08/19/future_iphones_ipads_could_recognize_adjust_for_individual_users.
Jansen et al., "Picture Password: A Visual Login Technique for Mobile Devices," National Institute of Standards and Technology, NISTIR 7030, Jul. 2003, 20 pages.

(56) References Cited

OTHER PUBLICATIONS

Pace, Zach, "Signing in with a picture password," http://blogs.msdn.com/b/b8/archive/2011/12/16/signing-in-with-a-picture-password.aspx, Dec. 16, 2011, 9 pages.
Scavo, T. et al., "Shibboleth Architecture," Jun. 8, 2005, retrieved on Jun. 20, 2014 from http:/open-systems.ufl.edu/files/draft-mace-shibboleth-tech-overview-latest.pdf, 31 pages.
Thibadeau et al., "Proofs of Knowledge on the Web: Framework for Password Identification and Capacity to Make Decisions," 2014-NIST-NSTIC-01 Abbreviated Proposal, Bright Plaza, Inc., Philadelphia, Mar. 2, 2014, 5 pages.
Zhao, Ziming et al., "On the Security of Picture Gesture Authentication," 22nd USENIX Security Symposium, Aug. 14-16, 2013, Washington, D.C., pp. 383-398.
International Search Report for PCT/US10/58825, dated Feb. 2, 2011, 2 pages.
Written Opinion of the International Searching Authority for PCT/US10/58825, dated Feb. 2, 2011, 4 pages.
International Preliminary Report on Patentability for PCT/US10/58825, dated May 23, 2012, 3 pages.
International Search Report and Written Opinion for PCT/US2014/032342, dated Jul. 4, 2014, 14 pages.
Written Opinion of the International Searching Authority for PCT/US2014/032342, dated Mar. 17, 2015, 6 pages.
International Preliminary Report on Patentability for PCT/US2014/032342, dated Jun. 24, 2015, 23 pages.
Extended European Search Report for European Patent Application No. 10845949.6, dated Oct. 9, 2014, 7 pages.
Non-Final Office Action for U.S. Appl. No. 12/884,478, dated Dec. 12, 2012, 15 pages.
Final Office Action for U.S. Appl. No. 12/884,478, dated May 20, 2013, 19 pages.
Advisory Action for U.S. Appl. No. 12/884,478, dated Sep. 9, 2013, 3 pages.
Notice of Allowance and Examiner-Initiated Interview Summary for U.S. Appl. No. 12/884,478, dated Apr. 4, 2014, 10 pages.
Non-Final Office Action for U.S. Appl. No. 14/330,986, dated Dec. 16, 2014, 18 pages.
Final Office Action for U.S. Appl. No. 14/330,986, dated Apr. 27, 2015, 20 pages.
Advisory Action and Examiner Initiated Interview for U.S. Appl. No. 14/330,986, dated Jul. 14, 2015, 3 pages.
Invitation to Pay Additional Fees and Partial International Search Report for PCT/US2015/027040, dated Jul. 24, 2015, 7 pages.
Menezes, A. et al., "Identification and Entity Authentication," Handbook of Applied Cryptography, CRC Press, 1997, pp. 385-424.
International Search Report and Written Opinion for PCT/US2016/033793, dated Jul. 22, 2016, 11 pages.
Corrected Notice of Allowability for U.S. Appl. No. 14/728,904, dated Aug. 10, 2016, 9 pages.
Non-Final Office Action for U.S. Appl. No. 14/728,759, dated Jul. 26, 2016, 16 pages.
Author Unknown, "Cognitive test," Wikipedia.com, last modified Oct. 28, 2014, retrieved on Nov. 11, 2015, 3 pages, https://en.wikipedia.org/w/index.php?title=Cognitive_test&oldid=631463869.
Author Unknown, "James McKeen Cattell," Wikipedia.com, last modified Sep. 9, 2015, retrieved on Nov. 11, 2015, 5 pages, https://en.wikipedia.org/wiki/James_McKeen_Cattell.
International Search Report and Written Opinion for PCT/US2015/027040, dated Nov. 20, 2015, 21 pages.
International Search Report and Written Opinion for PCT/US2015/033823, dated Dec. 2, 2015, 18 pages.
International Search Report and Written Opinion for PCT/US2015/044694, dated Oct. 2, 2015, 10 pages.
Notice of Allowance for U.S. Appl. No. 14/693,121, dated Jan. 22, 2016, 7 pages.
Final Office Action for U.S. Appl. No. 14/728,902, dated Jan. 29, 2016, 6 pages.
Non-Final Office Action for U.S. Appl. No. 14/728,904, dated Jan. 25, 2016, 15 pages.
Non-Final Office Action for U.S. Appl. No. 14/823,739, dated Nov. 30, 2015, 17 pages.
Final Office Action for U.S. Appl. No. 14/330,986, dated Feb. 4, 2016, 18 pages.
Final Office Action for U.S. Appl. No. 14/728,759, dated Feb. 1, 2016, 17 pages.
International Preliminary Report on Patentability for PCT/US2015/044694, dated Feb. 23, 2017, 8 pages.
Non-Final Office Action for U.S. Appl. No. 15/295,718, dated Mar. 9, 2017, 14 pages.
Final Office Action for U.S. Appl. No. 14/728,759, dated Feb. 15, 2017, 18 pages.
International Preliminary Report on Patentability for PCT/US2015/027040, dated Nov. 3, 2016, 15 pages.
International Preliminary Report on Patentability for PCT/US2015/033823, dated Nov. 3, 2016, 12 pages.
Examiner's Answer to the Appeal Brief for U.S. Appl. No. 14/330,986, dated Dec. 7, 2016, 21 pages.
Notice of Allowance for U.S. Appl. No. 15/069,635, dated Oct. 18, 2016, 7 pages.
Corrected Notice of Allowability for U.S. Appl. No. 14/728,904, dated Oct. 13, 2016, 9 pages.
International Preliminary Report on Patentability for PCT/US2015/033830, dated Dec. 15, 2016, 8 pages.
International Preliminary Report on Patentability for PCT/US2015/033811, dated Dec. 15, 2016, 7 pages.
Second Written Opinion for PCT/US2016/033793, dated Apr. 4, 2017, 5 pages.
Non-Final Office Action for U.S. Appl. No. 15/409,045, dated Apr. 19, 2017, 8 pages.
Non-Final Office Action for U.S. Appl. No. 15/295,701, dated Apr. 28, 2017, 6 pages.
Notice of Allowance and Examiner-Initiated Interview Summary for U.S. Appl. No. 15/295,718, dated Aug. 14, 2017, 16 pages.
Non-Final Office Action for U.S. Appl. No. 14/728,759, dated Aug. 3, 2017, 19 pages.
International Preliminary Report on Patentability for PCT/US2016/020670, dated Sep. 14, 2017, 7 pages.
International Preliminary Report on Patentability for PCT/US2016/033793, dated Jun. 27, 2017, 6 pages.

* cited by examiner

METHOD AND SYSTEM OF PROVIDING A PICTURE PASSWORD PROOF OF KNOWLEDGE AS A WEB SERVICE

This application is a 35 U.S.C. §371 national phase filing of International Application No. PCT/US2014/032342, filed Mar. 31, 2014, the disclosure of which is incorporated herein by reference in its entirety.

CROSS REFERENCE TO RELATED APPLICATION

This application claims the benefit of U.S. Provisional Patent Application Ser. No. 61/808,905, filed Apr. 5, 2013, which is incorporated by reference herein.

BACKGROUND

Background Information

Authentication of users on the web can involve what you know, what you have, and who you are. The first of these is a proof of knowledge.

One non-limiting example of a proof of knowledge is a technology known as picture password ("Picture Password", NIST NISTIR 7030, nist.gov July 2003), an implementation of which was recently incorporated into Windows® 8 for logging into the Windows® 8 operating system.

Another non-limiting example of a proof of knowledge is disclosed by U.S. Pat. Appl. Pub. No. 2011/0197259, entitled "Method And System For Processor Or Web Logon", which is incorporated by reference herein. This uses an image (e.g., without limitation, a still picture; a motion picture with or without sound; a photograph) and knowledge about the image that a person can readily remember.

There is room for improvement of systems providing a picture password proof of knowledge.

There is room for improvement, of methods providing a picture password proof of knowledge.

SUMMARY

These needs and others are met by embodiments of the disclosed concept in which a picture password proof of knowledge of an image is provided by a server to permit a relying party server to enable a user at a client browser to be verified and logged-in to the relying party server.

In accordance with one aspect of the disclosed concept, a server provides a picture password proof of knowledge of an image, the server comprises: a processor operable to: create an identifier to identify a user when communicating with a relying party server; send the identifier to the relying party server; create a login token in response to a user authentication request originating from a client browser; send a web address containing the login token to the relying party server; receive and authenticate a plurality of actions from the client browser regarding the picture password proof of knowledge of the image; generate and send an authentication token to the client browser responsive to the received and authenticated actions; receive from the relying party server a request for an identification token, the request including the authentication token; and generate and send the identification token to the relying party server to enable the user at the client browser to be verified and logged-in to the relying party server.

In accordance with another aspect of the disclosed concept, a method of providing a picture password proof of knowledge of an image by a server comprises: creating an identifier by a processor to identify a user when communicating with a relying party server; sending the identifier to the relying party server; creating a login token in response to a user authentication request originating from as client browser; sending a web address containing the login token to the relying party server; receiving and authenticating a plurality of actions from the client browser regarding the picture password proof of knowledge of the image; generating and sending an authentication token to the client browser responsive to the received and authenticated actions; receiving, from the relying party server a request for an identification token from the relying party server, the request including the authentication token; and generating and sending the identification token to the relying party server to enable the user at the client browser to be verified, and logged-in to the relying party server.

In accordance with another aspect of the disclosed concept, a system providing a picture password proof of knowledge of an image comprises: a relying party server; a client device including a web browser; and a web server cooperating with the relying party server and the web browser of the client device, the web server being operable to create an identifier to identify a user when communicating with the relying party server; send the identifier to the relying party server for storage with a user record at the relying party server: create a login token in response to a user authentication request originating from the web browser of the client device; send a web address containing the login token to the relying party server for redirection of the web browser; receive and authenticate a plurality of actions from the web browser regarding the picture password proof of knowledge of the image; generate and send an authentication token to the web browser responsive to the received and authenticated actions; receive from the relying party server a request for an identification token, the request including the authentication token; and generate and send the identification token to the relying party server to enable the user at the web browser to be verified and logged-in to the relying party server.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
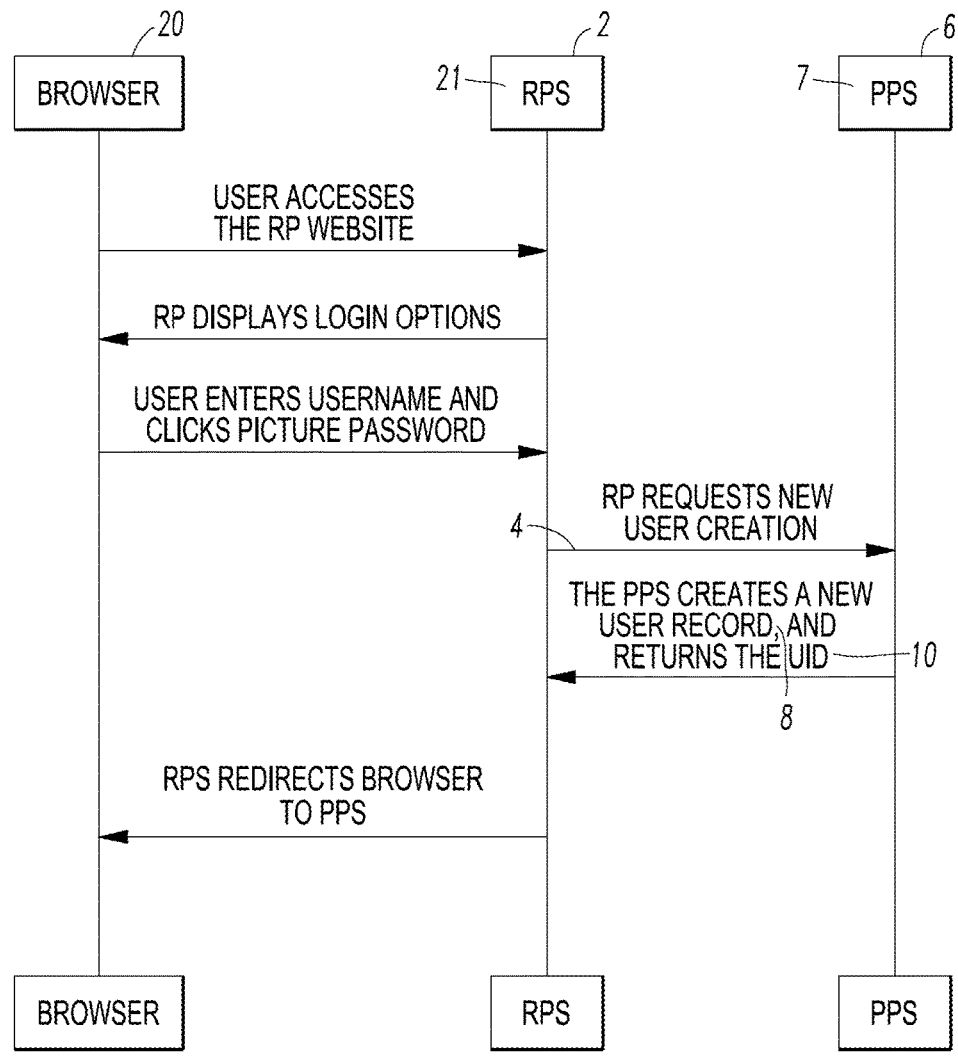
FIG. 1 is a flow diagram showing the creation of a new picture password account by a user's client browser, a relying party server and a picture password server in accordance with embodiments of the disclosed concept.

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor, a microcontroller; a microcomputer; a central processing unit; a mainframe computer; a mm-computer; a server; a web server; a client processor; a networked processor; or any suitable processing device or apparatus.

As employed herein, the term "AJAX" shall mean Asynchronous JavaScript® and XML, any suitable communication technique employed to send and recover data from an Internet or similar server, or any suitable communication technique understood by persons of ordinary skill in the Internet application art.

As employed herein, the term "picture password" shall mean "Picture Password" or any suitable system or method air a proof of knowledge about an image that a person can readily remember and/or recognize.

As employed herein, the term "client browser" shall mean a client apparatus or device including a web browser; a client apparatus or device including a client application which communicates using a client-server architecture; and a client apparatus or device including a client application for retrieving, presenting and traversing information of the Internet.

As employed herein, the term "hash" shall mean a cryptographic salted hash; a cryptographic salted bash function (e.g., NIST approved SHA256 Password Based Key Derivation Function—PBKDF); and a derivation of enciphered or encoded data used to authenticate integrity of corresponding information or actions with the well-known anti-dictionary attack protections afforded by cryptographic salting. The hash also includes a number of hash iterations as suggested by NIST approved PBKDF.

What is believed to be missing to date is a novel and non-obvious security and privacy architecture for using picture passwords for web logins, for example and without limitation, of web accounts (e.g., without limitation, a bank account; a brokerage account; an electronic billing or payment system; an e-mail system; a web service system; and an application service system). This requires maximal isolation of security and privacy sensitive information between a relying party (RP) that may invoke a picture password request based on knowledge of the identity of the user, a picture password server (PPS) that is only aware of an anonymous user, his/her image selection and a way to confirm his/her knowledge without receiving the plaintext password, and a client browser (CB) that may temporarily, during initial password creation and practice, necessarily have the plaintext password but not afterwards in routine proofs of knowledge. Further, communications must be self-proving between the CB and PPS because the CB may optionally run Javascript® source code which can be readily seen and manipulated by the end-user (e.g., since such source code can be seen and changed by the end-user via his/her browser) or any man-in-the-middle attacker (e.g., if an attacker had access to the communications, he/she could alter such source code before passing it along to the user).

A picture password replaces a typed in password, PIN, or pass phrase (hereinafter, "Password"). Associated with the proof of knowledge is a user name since it is possible to have a non-unique Password. Although picture passwords may be more unique than conventional Passwords, the user name can be required to be unique to the RP. For confidentiality and privacy reasons, it may be desirable to provide the picture password proof as a service independently of the RP's management of the user name.

Parties that rely on a user name and a proof of knowledge ("relying parties" or RPs) can then select alternative proofs of knowledge, perhaps even mote than one, to require authenticating a person for logging in to whatever service they provide.

Existing systems, such as OpenID (www.openid.net), tie the user name and Password or other proof of knowledge together in a simile service provider, known commonly a an Identity Provider (IDP). A relying party may request an IDP to independently confirm a user identity. It is common for this IDP to put the request for user name and Password on one web page, although some RPs will request the user name on one page and the Password on another. Also, OpenID can keep confidential the user name known by the RP and the user name known by the IDP. However. Passwords without user names are not collected as a service in systems such as OpenID.

Also, systems such as CAPTCHA may provide a service that proves that a person instead of a robot is present. But it is not common for a password to provide such protections similar to CAPTCHA. The disclosed concept discloses a method and system for providing such a password service.

Picture password on Windows® 8 does not provide such a service. It integrates the user name and picture password as one IDP, namely Windows® 8, even though picture password is optionally chosen by the user. Somewhat similar are systems associated "what you have" that require PINS, such as smart cards, where the user inputs user name, a smart card, and is asked for a PIN (or Password) for the proof of knowledge that shows that the user is present. However, the PIN proof in these systems is not a knowledge proof independent of both the smart card system and the user name system, if a proof of knowledge is provided as a service to RPs in order to enable the service they provide, then it would be useful if that proof of knowledge can provide guarantees that the actual person being authenticated, such as his/her user name, smart card key, or other identifying information, cannot be obtained by the proof of knowledge service provider. In effect, the RP can be assured that the proof of knowledge service provider cannot guess the user name and other identifying information. It is also important that the information provided to the CB at any time is also carefully controlled for security and privacy reasons. In the disclosed concept, as will be described, a picture password proof of knowledge can be implemented as a web service utilizing standard browser components (e.g., without limitation, HTML, CSS and Javascript®), or any other suitable type of Internet service utilizing a client-server architecture, while preserving key confidentiality and privacy requirements for the RP, PPS, and the CB.

It is assumed that all communications between the RP, PPS, and CB are via https (Transport Layer Security (TLS) and/or Secure Sockets Layer (SSL) (hereinafter "TLS/SSL") HTTP), or another suitable Security technology for establishing an encrypted link between a server and a client, where the RP and/or PPS minimally maintain a public key. Certificates for proof of authenticity and the https settings are NIST or ISO approved for authentication and confidentiality. The RP and PPS will communicate with verified certificates effectively thwarting man-in-the-middle attacks. A TLS/SSL proxy (that provides a fraudulent certificate or similar attack) between the CB and PPS may provide an effective man-in-the-middle, so consideration of this spying and manipulation opportunity is provided in the security and privacy mitigation described.

New Picture Password Account

Referring to FIG. 1, when a RP user wants to setup a Picture Password login, the RP first needs to request a new Picture Password account. The RP's server (RPS) 2 sends a request 4 to the PPS 6, which includes a suitable processor 7, requesting a new account. The RPS 2 does not provide any information about the user. The PPS 6 creates a new user record 8 and generates a universal ID (UID) 10 to use as an alias to identify the user when communicating with the RPS 2. This UID 10 is returned to the RPS 2, which stores it with the RP user's record on their server.

Figure 3:
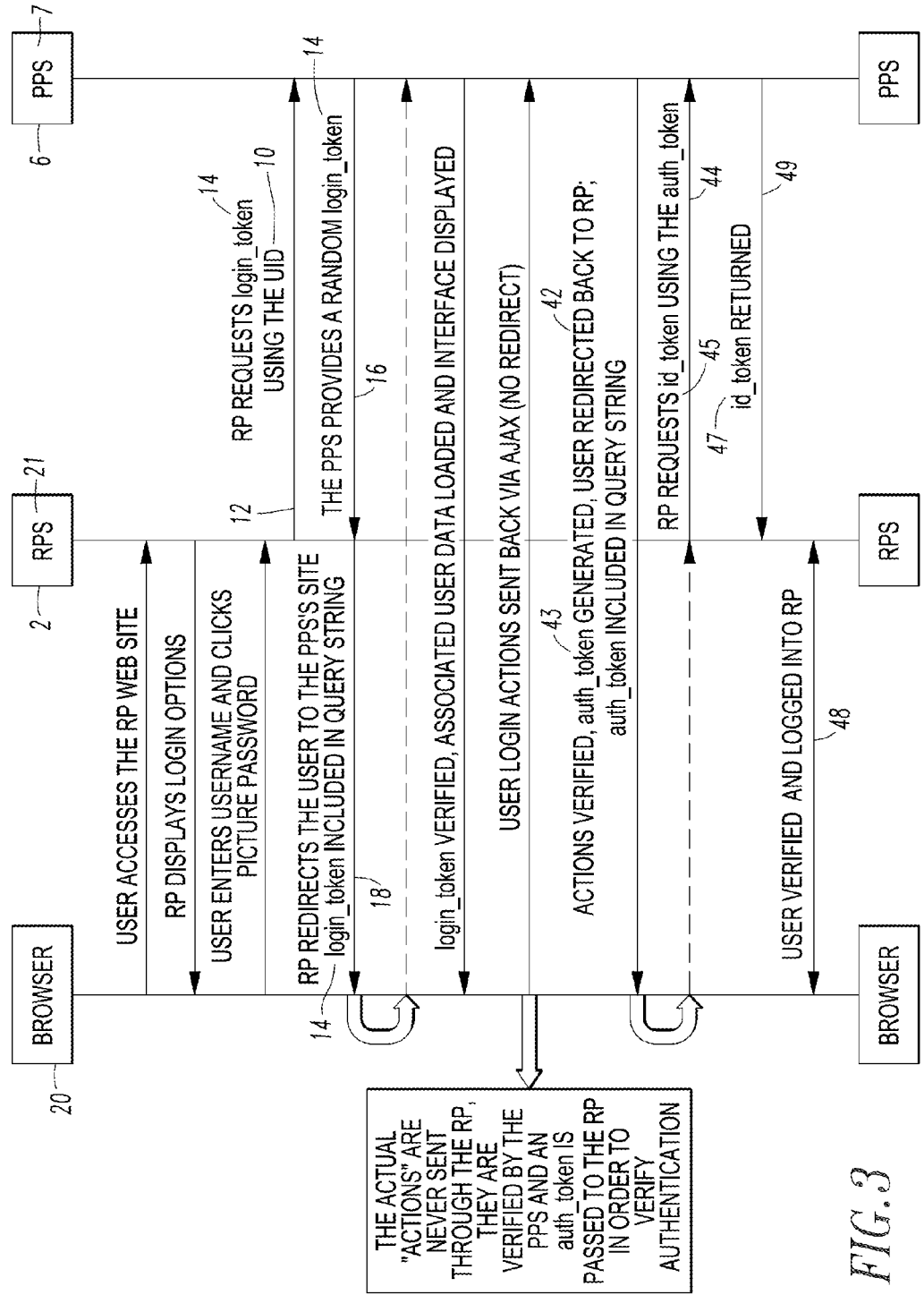
FIG. 3 is a flow diagram showing end to end login flow for end-users with existing picture password accounts by the end-user's client browser, a relying party server and a picture password server in accordance with embodiments of the disclosed concept.

As shown in FIG. 3, after the new account is created, the RPS 2 sends the PPS 6 a request 12 for a login token (login token 14), providing the new UID 10 in the request 12. The login token 14 includes a time-out period associated with how long the user will be allowed to provide his/her proof of knowledge to the PPS 2. The login_token 14 also contains the salt associated with the UID 10. The PPS 6 returns the login_token 14, at 16, and the RPS 2 redirects, at 18, the user's browser (CB) 20 to the PPS URL.

Figure 2:
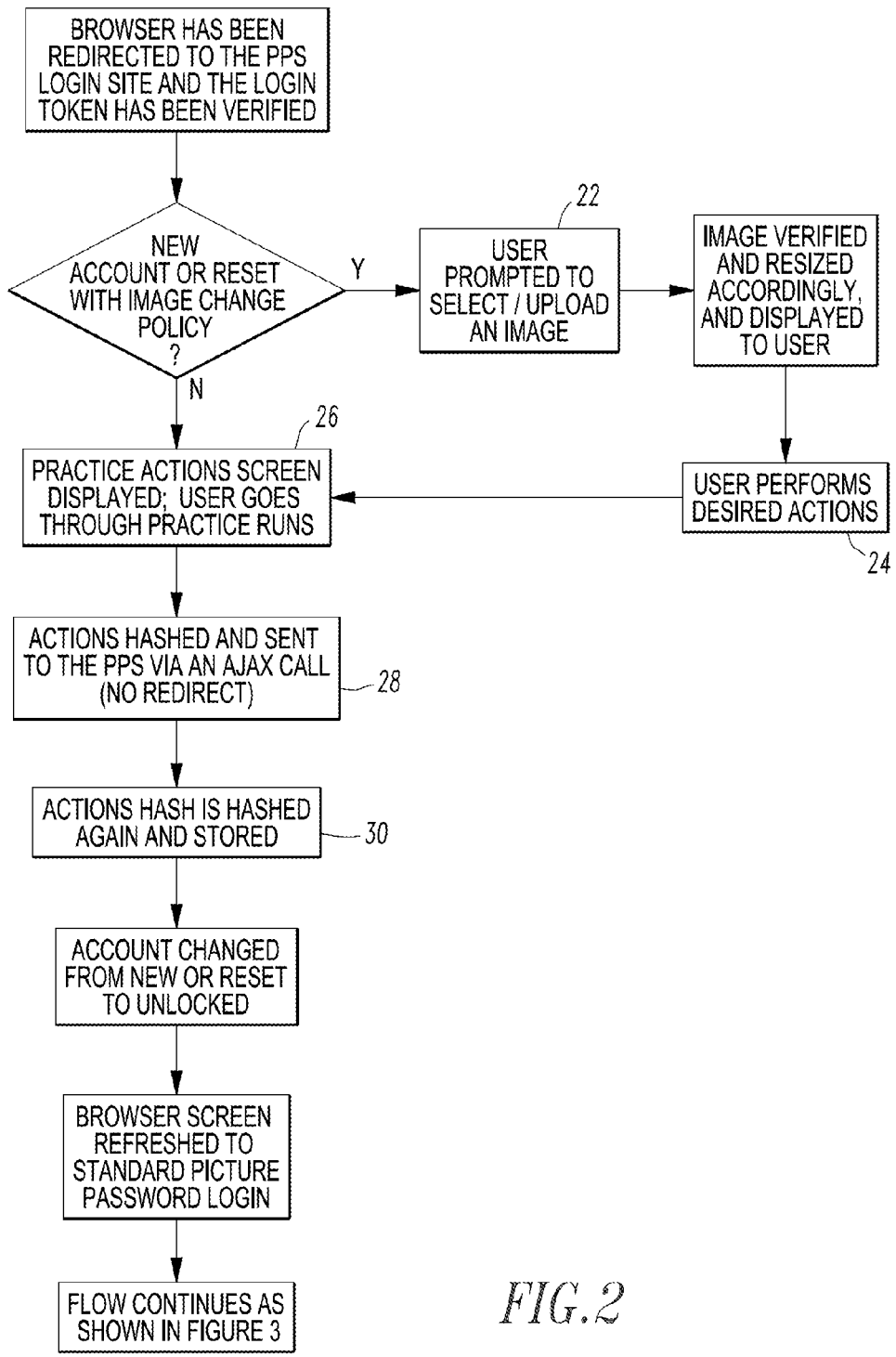
FIG. 2 is a flowchart showing picture password setup between the user's client browser and the picture password server of FIG. 1 for a new or reset picture password account.

The user is prompted, at 22, to upload or select an image to use as their Picture Password image as is shown in FIG. 2. The user then performs his/her desired actions, at 24, and saves them. After saving, the user is prompted, at 26, to complete multiple practice rounds (e.g., without limitation, some with assistance; some without) to ensure they can repeat their sequence of actions properly. After successful practices are completed and the user is satisfied with the password he/she has created, the action sequence is hashed, at 28, and sent to the PPS 6. The PPS 6 is denied access to the plaintext picture password generated by the user. The PPS 6 hashes the CB hash, at 30, which may be relatively weak (in NIST approved iteration counts on PBKDF, for example) because the CB hash code is present in source on the CB 20, but the PPS 6 strengthens (e.g., adds iterations) and stores this hardened hash, and not the weaker one, in the user record of the PPS 6.

Proof of Knowledge

Figure 4:
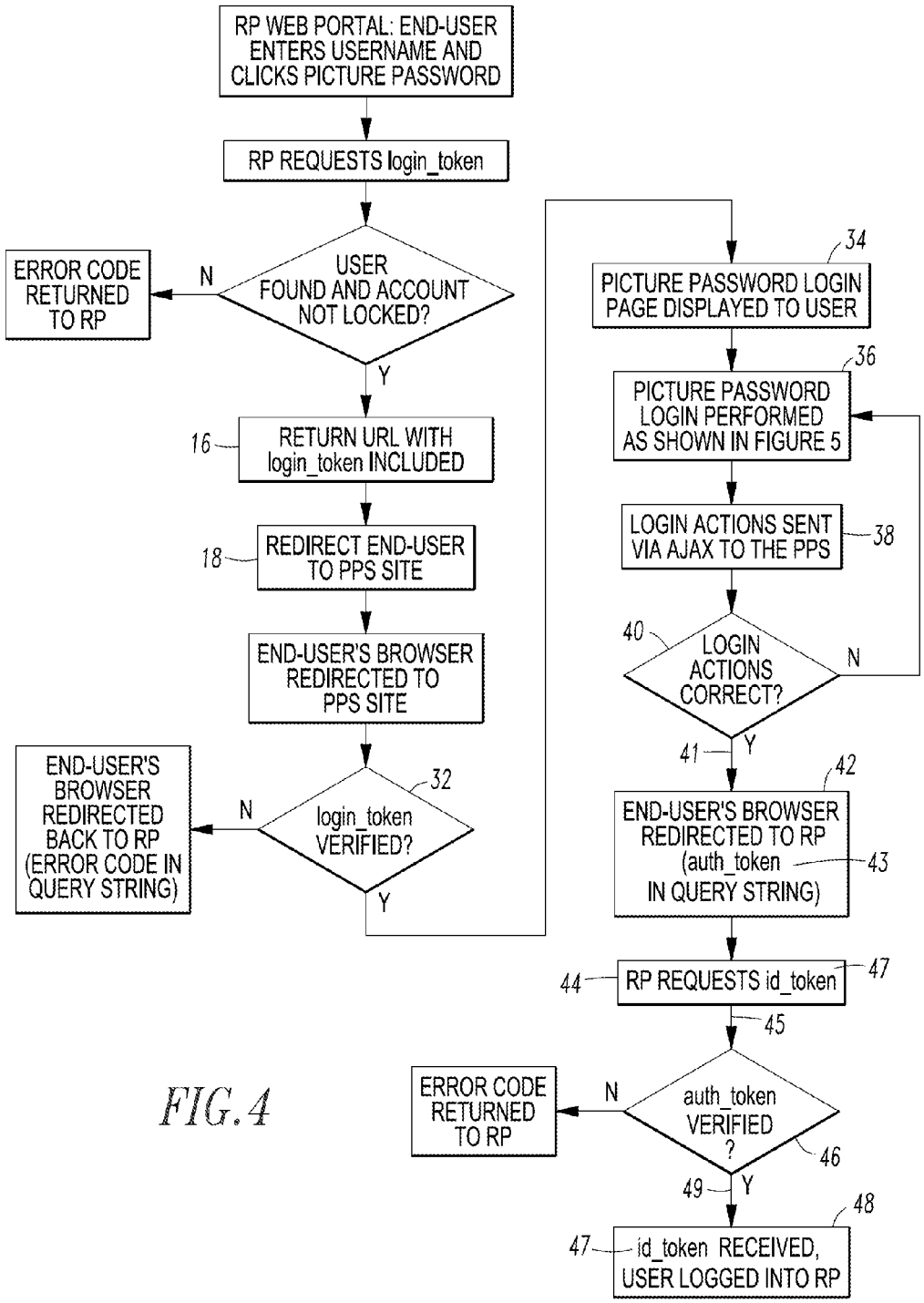
FIG. 4 is a flowchart of end to end login flow for the flow diagram of FIG. 3.
Figure 5:
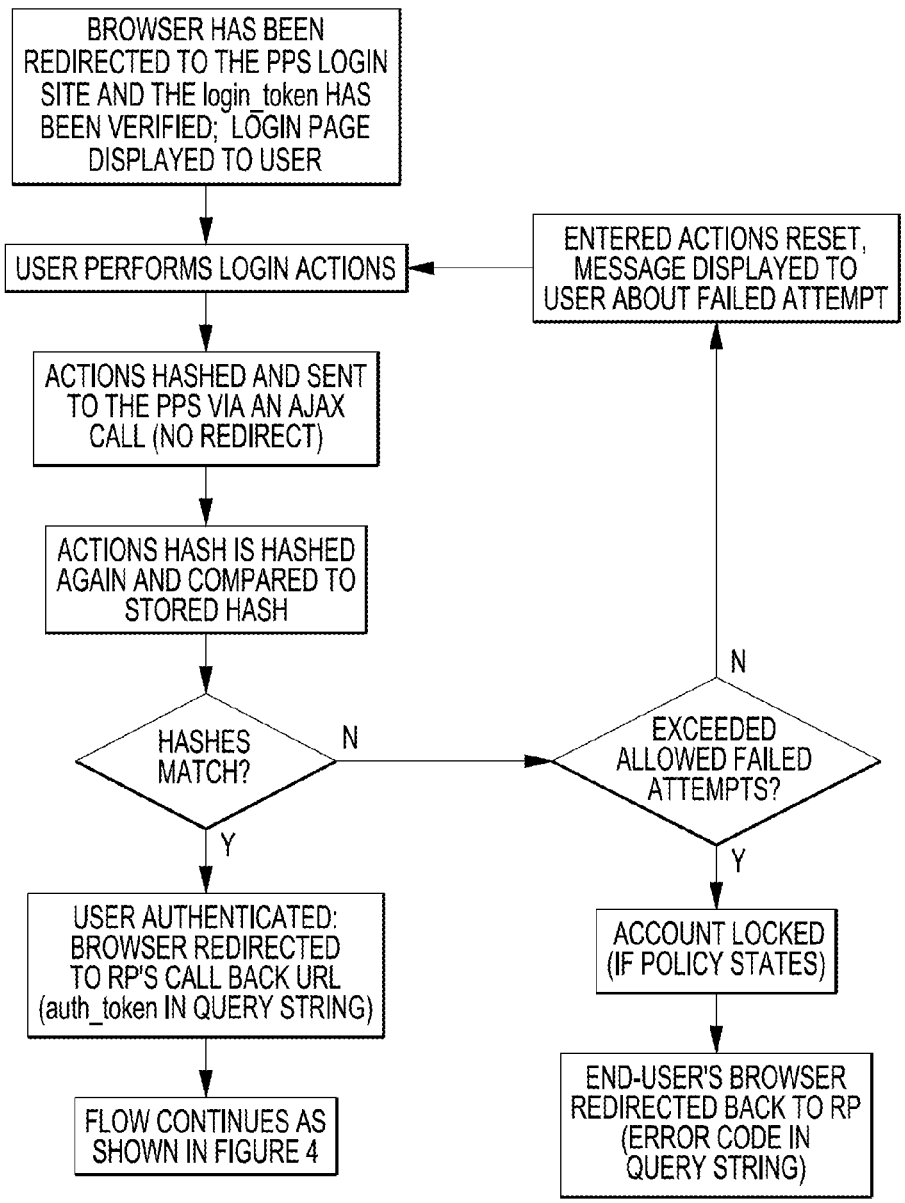
FIG. 5 is a flowchart of login flow for end-users with existing picture password accounts by the end-user's client browser and the picture password server for part of the end to end login flow of FIG. 4.

Referring to FIGS. 3-5, when a RP user wants to login using Picture Password login, the RPS 2 sends the PPS 6 the request 12 for the login_token 14, including the IUD 10, associated with the user in the request. The PPS 6 returns, at 16, the login_token 14, and the RPS 2 redirects, at 18, the CB 20 to the PPS URL.

Referring now to FIG. 4, when the CB 20 connects to the URI, of the PPS 6, the PPS 6 verifies, at 32, the login_token 14, loads the corresponding user data including time-out period and salt, and displays the Picture Password interface to the user, at 34. The user performs his/her actions, at 36, which are then hashed (see FIG. 3) and sent to the PPS 6 for verification, at 38. If the actions are verified, at 40, then the PPS 6 generates an authentication token (auth_token) 43 (or, without limitation, an authorization token) and sends, at 41, the authentication token 43 to the CB 20 responsive to the received and authenticated actions, at 40. This then redirects the user back to the RP's website 21 (FIG. 3), at 42, including the authentication token 43.

The RPS 2 makes a call to the PPS 6 including the authentication token (auth_token 43) in the request 45, at 44. The PPS 6 verifies the auth_token 43, at 46, and generates an IL) token (id_token 47) with all applicable information about the user authentication, including their UID 10. The auth_token 43 is used to provide information to the PPS 6, in order that the RPS 2 can get the id_token 47 that contains the UID 10, which is the anonymized user name that the RPS 2 can recognize and associate with the proper user identity. The PPS 6 returns, at 49, the ID token 47 to the RPS 2. The RPS 2 cross references the user's PPS UID with his/her actual user name on the RPS 2 and logs the user in (or, without limitation, authorizes the user), at 48 (FIG. 4).

The RP user name is never communicated to the PPS 6. All communications between the RPS 2 and the PPS 6 use the UID alias. Only the RPS 2 can connect the UID 10 to the actual user. The RPS 2 stores the new UID 10 with the user's RP user name, and uses this UID as an alias for the user on all communications with the PPS 6.

Optional Policies Set by the Relying Party

Relying Parties have the option to set several policies regarding their users use of Picture Password and thus require security and privacy isolation between the RPS 2, PPS 6, and CB 20 as before.

Hints: can be enabled allowing the user to enter a hint for each action performed during password setup. Hints generated by the PPS 6 can also provide robot resistance. Hints are not known to the RPS 2, but the RPS 2 can set policy to employ them.

Minimum/Maximum Actions: these values determine the range of a minimum and a maximum allowed number of actions a user uses during password setup. The maximum value is also used in failure detection. For example, Windows® 8 Picture Password allows exactly three actions. The disclosed picture password server (PPS 6), such as an example web server, provides for a minimum and a maximum number for the RPS 2 and, therefore, provides greater freedom for the RPS 2 to select its own policies. If a manipulation of the Javascript® source code changes these values, it cannot affect the proof of knowledge decision because the PPS 6, but not the GB 20, has the reference Hash which is unique to the actual actions in the proof of knowledge.

Minimum Entropy: when setting up actions for a password, they must meet or exceed this value. The RPS 2 can set the minimum entropy requirement and can also be told the entropy of the picture password employed by the user.

Maximum Failures: the maximum times a password can be performed incorrectly until the user account is either locked or the user redirected back to the RP's website 21 as determined by policy residing in the PPS 6. Since the PPS 6 is not aware of the actual actions input by the user, a failure is calculated in one of three ways. When a user clicks "clear actions", a failure is reported to the PPS 6. When a user clicks "submit" and the password is incorrect, a failure is tracked. If auto-submit is enabled, all failures are considered exhausted if the PPS 6 receives submissions totaling Maximum Actions times Maximum Failures.

Failure Action: what to do when a user reaches the Maximum Failures value. Example choices are lock the account and redirect the user back to the RP's website 21 or just redirect the user back to the RP's website 21 as determined by policy provided by the RPS 2 and resident only in the PPS 6.

Login Token Expiration: the amount of time that generated login tokens are valid. This is determined by the PPS 6 as optionally set by the RPS 2 and is therefore not dependent on the CB 20 although the CB 20 may optionally also have a timer to inform the user of the session termination. Login tokens are temporarily associated with the UID 10.

UI Customization: several policies concerning whether or not a user can customize visual aspects of the Picture Password user interface (UI). Example policies are whether or not a user can toggle the showing of circles, numbers, dots and lines. Also, an RPS 2 may customize visual aspects of the picture password user interface. By default, the RP website name personalizes the CB user interface and the PPS 6 keeps track of their last user-selected state by this RP website name. These policies are not critical to the security of the proof of knowledge.

Auto-Submit: when enabled, a hash of the user's actions will be auto-submitted to the PPS 6 after each and every action after the optional minimum number of actions is reached as determined in the CB 20. Manually hitting the submit button is not required. Auto-submit can leak information to a man-in-the-middle since successive hashes greatly reduce the effective entropy in the action series, and so a policy can turn off auto-submit. The minimum limit number can be manipulated in the CB 20 so turning off auto-submit in the PPS 6 and CB 20, so that every submit is counted as a try in the PPS 6 and manipulation of the Javascript® source code either in the CB 20 or a man-in-the-middle will have less success.

Image Change on Reset: when enabled by RP policy on the PPS 6, a user will be forced to change their image if they request a reset on their account. This is because if a user creates a number of picture passwords on the same image, it tends to be relatively hard to remember which picture password on the image is the right one.

CAPTCHA Style anti-robot Authorization: when enabled, the user will be forced to complete a CAPTCHA style authorization in addition to their regular Picture Password. This will consist of a pre-selected image and set of action(s) chosen by RP policy and administered by the PPS 6. The pre-selected image may be merged into the user image as a ghost image, or may be selected from a set of hints the user has provided on the user image itself, or automatically computed by automated image analysis of the user image. The user will be given hints as to what actions to perform on the image and the CB 20 will report the hash of this separate authorization to the PPS 6 for verification.

The pre-selected image selected by the user and provided later for a proof of knowledge is perfectly equivalent to a known "is this your picture?" test against man-in-the-middle attacks that use fraudulent TLS/SSL certificates, which is common on the web today. The disclosed web picture password incorporates such a pre-selected image or picture defense as an integral part of the login proof of knowledge.
Advanced Authentication If the proof of knowledge hash has enough entropy to ensure uniqueness, then the proof of knowledge itself can serve to look up the user name for a particular RP without the user having to type that in or select it through the RPS 2.

The corresponding method is identical to that generally described above, except that the UID 10 token sent by the RPS 2 is a globally unique UID token that indicates that the user is not known, and the PPS id_token 47 returned, at 49, is the UID token for the specific RP and additionally returned with a success or failure.

In this fashion, the proof of knowledge itself can additionally be shared among RPs sharing compatible policies thereby enabling a user to use the same proof of knowledge among multiple RPs without the user having to go to the trouble of putting tip the same picture and creating the same actions among multiple RPs.

Since only the PPS 6 knows the images and appropriate hashes, the RPs may regard the PPS 6 as an identity provider as well as a proof of knowledge provider while not disclosing to the PPS 6 other identity information such as the user's actual name, his/her RP account number, and other identifying information. An example is that the CB 20 retains the user image selection from prior use so that the RPS 2 simply asks for the proof of knowledge on whatever the user has already set up.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A picture password server providing a picture password proof of knowledge of an image, said picture password server comprising:
   a processor operable to:
   create a login token in response to a request for the login token including an identifier which identifies a user when communicating with a relying party server, the request originating from the relying party server;
   send the login token to the relying party server;
   receive a communication from a client browser, the communication comprising the login token;
   in response to verifying that the login token is valid, receive a plurality of actions from the client browser regarding the picture password proof of knowledge of the image;
   in response to authenticating the plurality of actions from the client browser regarding the picture password proof of knowledge of the image based on stored information for the identifier, generate and send a communication comprising an authentication token to the client browser;
   receive, from the relying party server, a request for an identification token, the request including the authentication token; and
   in response to verifying that the authentication token is valid, send a communication comprising the identification token to the relying party server to enable a login to the relying party server at the client browser.

2. The picture password server providing the picture password proof of knowledge of the image of claim 1 wherein the processor is further operable to generate the identification token without obtaining a user name, a smart card key, or any other identifying information regarding the user at the client browser.

3. A method of providing a picture password proof of knowledge of an image by a picture password server, said method comprising:
   creating a login token in response to a request for the login token including an identifier which identifies a user when communicating with a relying party server, the request originating from the relying party server;
   sending the login token to the relying party server;
   receiving a communication from a client browser, the communication comprising the login token;
   in response to verifying that the login token is valid, receiving a plurality of actions from the client browser regarding the picture password proof of knowledge of the image;
   in response to authenticating the plurality of actions from the client browser regarding the picture password proof of knowledge of the image based on stored information for the identifier, generating and sending a communication comprising an authentication token to the client browser;
receiving, from the relying party server, a request for an identification token from the relying party server, the request including the authentication token; and
in response to verifying that the authentication token is valid, send a communication comprising the identification token to the relying party server to enable a login to the relying party server at the client browser.

4. The method of claim 3 wherein the relying party server provides one of a bank account, a brokerage account, an electronic billing or payment system, an e-mail system, a web service system, and an application service system.

5. The method of claim 3 wherein the method of providing the picture password proof of knowledge of the image by the picture password server is a method of providing the picture password proof of knowledge of the image as a web service.

6. The method of claim 3 wherein the picture password server and the relying party server employ verified TLS/SSL certificates.

7. The method of claim 3 wherein receiving the plurality of actions from the client browser comprises receiving the plurality of actions from the client browser through a TLS/SSL proxy between the client browser and the picture password server.

8. The method of claim 3 further comprising:
receiving policies from the relying party server regarding use of the picture password proof of knowledge of the image.

9. The method of claim 8 further comprising:
employing as one of the policies a policy to allow entry of a hint during setup of the picture password proof of knowledge of the image for an action to be performed.

10. The method of claim 8 further comprising:
employing as one of the policies a policy to require a minimum entropy value for the picture password proof of knowledge of the image.

11. The method of claim 8 further comprising:
employing a website by the relying party server; and
employing as one of the policies a policy to either redirect the client browser to the website of the relying party server, or lock a user's account and redirect the client browser back to the website of the relying party server after a predetermined number of failures for actions of the picture password proof of knowledge of the image.

12. The method of claim 8 further comprising:
employing as one of the policies a policy to maintain validity of the created login token for a predetermined period of time.

13. The method of claim 8 further comprising:
employing as one of the policies a policy to permit customization of a user interface for the picture password proof of knowledge of the image.

14. The method of claim 8 further comprising:
employing as one of the policies a policy to enable or disable an automatic submission, by the client browser, to the picture password server of a hash of actions for the picture password proof of knowledge of the image after a predetermined number of said actions.

15. The method of claim 8 further comprising:
employing as one of the policies a policy to require a change to the image if a reset of a user account is requested by the client browser.

16. The method of claim 8 further comprising:
employing as the image a first image; and
employing as one of the policies a policy to require a separate authorization including a second image and a number of actions administered by the picture password server before the picture password proof of knowledge of the image.

17. The method of claim 3 further comprising:
employing as the identifier a globally unique user identifier that indicates that the user is not known; and
employing as the identification token another identifier for a specific relying party.

18. The method of claim 17 further comprising:
employing the picture password proof of knowledge of the image among a plurality of different relying parties.

19. The method of claim 17 wherein the picture password server knows the identifier used to identify the user by the relying party server but does not know the image and a hash of actions for the picture password proof of knowledge of the image by the relying party server and does not know a user name, a user account number, a smart card key, or any other identifying information regarding the user by the relying party server.

20. The method of claim 19 further comprising:
retaining a selection of the image by the client browser from a previous picture password proof of knowledge of the image; and
receiving a request from the relying party server for a subsequent picture password proof of knowledge based upon said retained selection of the image and said plurality of actions from the client browser being predetermined.

21. The method of claim 3 wherein the stored information for the identifier comprises information stored during setting the picture password proof of knowledge of the image by the picture password server.

22. A system providing a picture password proof of knowledge of an image, said system comprising:
a relying party server;
a client device including a web browser; and
a web server cooperating with the relying party server and the web browser of the client device, said web server being operable to:
create a login token in response to a request for the login token including an identifier which identifies a user when communicating with a relying party server, the request originating from the relying party server;
send the login token to the relying party server for redirection of the web browser;
receive a communication from the web browser, the communication comprising the login token;
in response to verifying that the login token is valid, receive a plurality of actions from the web browser regarding the picture password proof of knowledge of the image;
in response to authenticating the plurality of actions from the web browser regarding the picture password proof of knowledge of the image based on stored information for the identifier, generate and send a communication comprising an authentication token to the web browser;
receive, from the relying party server, a request for an identification token, the request including the authentication token; and
in response to verifying that the authentication token is valid, send a communication comprising the identification token to the relying party server to enable a login to the relying party server at the web browser.

23. The system of claim 22 wherein the relying party server is operable to provide one of a bank account, a brokerage account, an electronic billing or payment system, an e-mail system, a web service system, and an application service system.

* * * * *